United States Patent

Vinokur

[15] 3,641,492
[45] Feb. 8, 1972

[54] VEHICLE ANTITHEFT DEVICE UTILIZING CIGARETTE LIGHTER AS TIMER

[72] Inventor: David Vinokur, 16217 Dalark St., La Puente, Calif. 91744

[22] Filed: Mar. 30, 1970

[21] Appl. No.: 23,903

[52] U.S. Cl. .................................. 340/65, 180/114, 340/63
[51] Int. Cl. ........................................................ B60r 25/10
[58] Field of Search ............................. 340/65, 63; 180/114; 307/10 AT

[56] References Cited

UNITED STATES PATENTS

| | | | |
|---|---|---|---|
| 1,846,966 | 2/1932 | Hausse | 340/65 |
| 3,074,049 | 1/1963 | Saliba et al. | 340/65 |
| 3,160,868 | 12/1964 | Kowanda | 340/65 |

*Primary Examiner*—John W. Caldwell
*Assistant Examiner*—Glen R. Swann, III
*Attorney*—Sellers and Brace

[57] ABSTRACT

A vehicle antitheft accessory readily connectable in circuit with the vehicle electrical system for the horn, running lights and the customary cigarette lighter, and utilizing the latter as a timer to temporarily deactivate an antitheft alarm but not the vehicle lights to permit the driver to exit, lock the vehicle and leave the immediate vicinity. Termination of the lighter timing cycle automatically arms the alarm device and any attempt to enter or move the vehicle is effective to energize the alarm intermittently and irregularly thereby alerting bystanders to the fact that a vandal or unauthorized person is attempting to enter or molest the vehicle.

5 Claims, 1 Drawing Figure

PATENTED FEB 8 1972
3,641,492
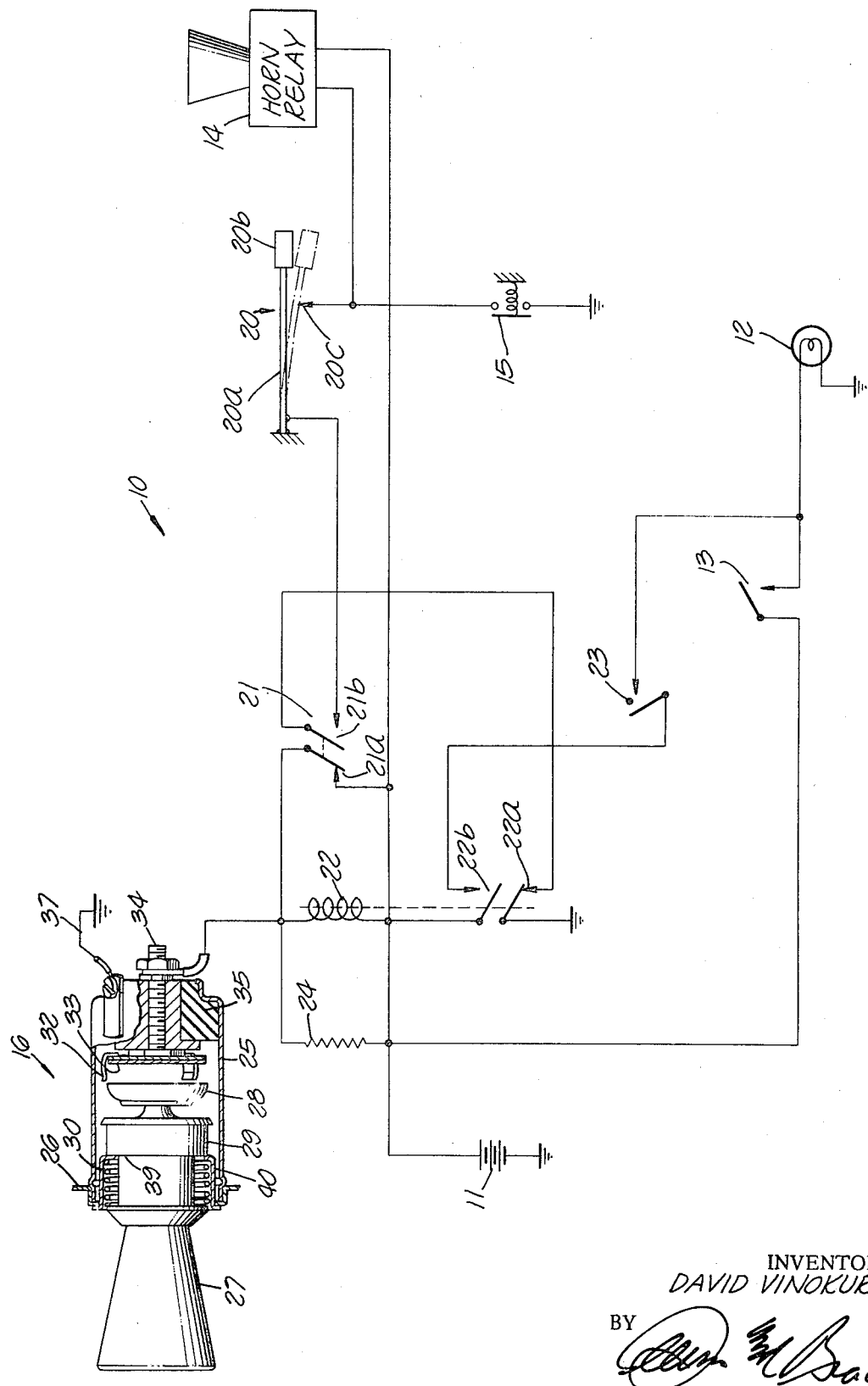
INVENTOR
DAVID VINOKUR
BY
ATTORNEYS

3,641,492

VEHICLE ANTITHEFT DEVICE UTILIZING CIGARETTE LIGHTER AS TIMER

BACKGROUND OF THE INVENTION

This invention relates to antitheft devices and more particularly to a simple alarm accessory readily installable in a motor vehicle electrical system and cooperating therewith to thwart an attempt by unauthorized persons to enter or molest the vehicle.

Among the many proposals heretofore made to protect motor vehicles against use by unauthorized persons are devices connectable in circuit with the vehicle horn and including means for conditioning the device to blow the vehicle horn if an attempt is made to enter or molest the vehicle. While such deices have numerous advantages they are subject to the serious shortcoming that it is difficult for the operator to either leave or reenter the vehicle without activating the warning device after it has been armed.

SUMMARY OF THE INVENTION

By the present invention the foregoing and other shortcomings of this general type of vehicle theft thwarting devices are avoided utilizing simple and inexpensive expedients. According to one preferred embodiment of the invention, the conventional vehicle cigarette lighter is employed as an automatic timer to control circuit means for deactivating the antitheft device for a short interval and for thereupon arming the alarm. The normal operating cycle of the timer measures this short interval which is of sufficient duration to permit the driver to leave the vehicle and to lock the door in a leisurely fashion following which the automatic release of the lighter serves to fully arm the warning device. Thereafter, any attempt to enter, move or operate the vehicle will cause intermittent operation of the vehicle horn in a distinctive manner readily recognized by and alerting any persons in the vicinity, thereby frightening the intruder and causing him to flee. Preferably and desirably the accessory also includes means utilizing the cigarette lighter to maintain the vehicle headlights energized for a short interval adequate to permit the operator to exit, close the garage doors or to leave the vicinity of the vehicle aided by the light furnished by the headlights. The next time the operator uses the vehicle he merely opens a manual switch connected in the lighting circuit and previously closed to arm the automatic delayed cutoff for the headlights. Alternatively, the manual switch may be omitted in which case the arming relay for the motion-responsive switch automatically activates the vehicle lights for a short period each time the operator leaves the vehicle after placing the arming switch in its alarm-conditioning position.

It is therefore a principal object of the invention to provide a simple, foolproof, antitheft accessory for attachment to a motor vehicle electrical system and effective in cooperation therewith to arm a distinctive intruder alarm a predetermined interval after being manually set.

Another object of the invention is the provision of a simple, inexpensive, rugged vehicle theft-thwarting accessory utilizing a motion-sensitive switch to sound an alarm upon the slightest movement of the vehicle and utilizing the release of the vehicle cigarette lighter to arm the accessory.

Another object of the invention is the provision of means for maintaining the lights of a motor vehicle energized for a brief period and thereupon automatically deenergizing the lights and utilizing the operating cycle of the vehicle cigarette lighter as the control agency.

A further object of the invention is the provision of circuit means utilizing a motor vehicle cigarette lighter as a delay-measuring means for extinguishing the vehicle lights and additionally to arm an audible alarm system circuit for sounding an alarm should an unauthorized person enter or molest the vehicle.

These and other more specific objects will appear upon reading the following specification and claims and upon considering in connection therewith the attached drawing to which they relate.

Referring now to the drawing in which a preferred embodiment of the invention is illustrated:

BRIEF DESCRIPTION OF THE DRAWING

The drawing comprises a schematic of one preferred illustrative embodiment of the invention showing the positions of all switches under normal vehicle operating conditions and with the alarm disarmed.

DESCRIPTION OF THE PREFERRED EMBODIMENT

The antitheft accessory, designated generally 10, utilizes certain standard components present in all motor vehicles including battery 11, the vehicle headlights 12, the headlight control switch 13, the vehicle horn and horn relay 14, horn button 15, and the conventional automatic cigarette lighter 16. Additional components connected in circuit therewith include a motion sensitive or responsive switch 20, a double-throw arming switch 21, a double-contact relay 22, an auxiliary headlight control switch 23 and a resistor 24.

Cigarette lighter 16 together with the resistance network in series therewith is utilized as a timer in addition to its normal function to energize an incandescent heater for lighting a cigarette. This resistance network comprises the coil of relay 22 and resistor 24 which, in combination with the lighter heater, increases the normal heating cycle of the cigarette lighter to some suitable time period as 2 minutes. The lighter may be of any conventional construction having a tubular metallic housing 25 rigidly supported on the vehicle dashboard 26 and releasably seating a removable knob 27 supporting an electric heater unit 28 in its inner end. Handle 27 has limited axial movement relative to a support sleeve 40 and is normally urged outwardly to its extended position by a compression spring 30 having one end pressing against a flange of handle 27 and its other end bearing against a flange at the inner end of sleeve 40. When handle 27 is pressed inwardly the periphery of heater element 28 is held captive by the resilient fingers 32 secured about the rim of the bimetal thermostatic disc 33 having its center welded or otherwise secured to a bolt 34 supported in a ring of insulation 35. One end of the heater element receives current from bolt 34 via thermostat 33 and fingers 32 whereas the other end makes electrical contact with a ground connection 37 by way of the inner end 29 of handle 27, sleeve 40 and housing 25. When thermomemmer 33 is cold, it is substantially flat and fingers 32 curl inwardly and are effective to grip and retain heater 28 captive. During the heating cycle of approximately 2 minutes required for the heating element to reach incandescence, the bimetal 33 curls or bulges in a direction to expand the spring fingers 32 out of gripping relation with the heater housing and allowing spring 30 to eject handle 27 to the left until its shoulder 39 comes to rest against the adjacent end of sleeve 40. Metal housing 28 for the heater is now disengaged from the fingers 32 with the result that its energizing circuit is opened and deactivated. The manner in which opening of this heater circuit is employed to arm the invention antitheft device will now be described.

Thus, as is clearly shown in the drawing, the electrical switching device or relay coil 22 is connected in circuit with battery 11 and with the heater terminal post 34. This relay has a pair of contacts 22a, 22b connected to operate in synchronism the first being normally closed whenever the relay is deenergized, and contact 22b being normally open.

Arming switch 21 likewise includes a pair of operatively interconnected contact 21a, 21b, the former being normally closed and the latter being closed only when switch 21 is manually moved to its alternate position to condition the alarm device for use.

The inertia or motion responsive switch 20 comprises a cantilever leaf spring 20a having one end rigidly secured to the vehicle and its free end equipped with a weight 20b causing the spring leaf to vibrate at a suitable relatively low frequency whenever the vehicle body is subjected to movement of any kind. It will be understood that contact 20c is normally open.

However, if the vehicle is subjected to shock or vibration of any kind the leaf spring vibrates to and fro thereby momentarily closing contact 20c to complete an electric circuit to the horn or other alarm device once during every complete cycle of vibration.

The operation of the invention theft detector will be readily apparent from the foregoing description of its components and their operative relationship to one another. Normally, all switches and parts are in the position shown and the vehicle, including the accessories such as the lighter, headlights and the horn, can be operated in the usual manner.

When the user parks the vehicle and prepares to leave it unattended, he merely depresses lighter plug 27 and operates the arming switch 21 to its alternate position to open contact 21a and close contact 21b. This switch is usually mounted behind the dashboard or in some readily accessible concealed position known only to the vehicle operator. Prior to closing switch 21 to the right, the operator checks to see that other occupants of the vehicle have departed whereupon he depresses the cigarette lighter handle 27 and immediately thereafter closes arming switch 21 to the right. The seating of the heater 28 beneath the contact spring fingers 32 retains the heater in this activated position and simultaneously completes an energizing circuit to both the lighter heater and relay 22. Contact 22a now opens and contact 22b closes, the opening of contact 22a opens the power circuit to both the motion-sensitive switch 20 and horn 14. So long as contact 22a remains open horn 14 cannot be energized except by pressing its button switch 15.

The vehicle operator is afforded approximately 2 minutes time within which to leave the vehicle, close the door and lock it. At the end of that time the cigarette lighter automatically releases thereby deenergizing the heater circuit as well as the power supply to relay 22. The latter now opens contact 22b and closes contact 22a thereby arming a power circuit to the normally open motion-sensitive switch 20 by way of arming switch 21 contact 21b of which is now closed.

If any intruder or vandal attempts to enter the vehicle or to move it, either under its own power or by other power, the vibratory detector switch 20 will immediately sense the intrusion and alternately open and close contact 20c to complete a power circuit to horn 14. This distinctive interrupted signal will be noticed immediately by any person in the vicinity. There is no risk of depleting the battery since a short time after the intrusion ceases the sensing device 20 will come to rest in an open position and the horn will cease to blow. However, as will be recognized, the device continues in a fully armed state and in readiness to detect any further intrusion.

If the vehicle operator wishes to utilize the headlights to light the driveway or a garage after dark while he is leaving the vicinity of the vehicle, he operates the device in the following manner. Immediately prior to exiting, the operator depresses the cigarette lighter handle 27, opens the headlight switch 13 and closes the auxiliary headlight switch 23. Relay 22 and its contact 22b now act as an arming control for the headlights by maintaining the headlights energized for a short interval adequate for the operator to leave the vehicle and its vicinity with the aid of the headlights. At the end of this short interval, the cigarette lighter automatically releases in the usual way thereby deactivating relay 22 and automatically extinguishing the headlights 12. When the operator next uses the vehicle, he opens the headlight-arming switch 23 and restores control of the headlights to the customary vehicle headlight control switch 13.

While the particular vehicle antitheft device herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. In a vehicle antitheft device of the type having motion-responsive switch means operable to activate the vehicle horn should an intruder enter or molest the vehicle, that improvement which comprises: relay means for utilizing the vehicle cigarette lighter as a timer to delay the supply of current to said motion-responsive switch means for a short interval to afford the operator time to exit and lock the vehicle door, and manually operable arming switch means in circuit with said cigarette lighter and with said motion-responsive switch means operable to render said cigarette lighter effective to initiate a timing cycle of the latter.

2. An antitheft device as defined in claim 1 characterized in that said manually operable arming switch means is operable between first and second positions thereof, and includes circuit means operable to disarm said antitheft device when said arming switch means is in the first position and to arm said alarm device when in the second position thereof.

3. An antitheft device as defined in claim 1 characterized in that said device is connectable in circuit with the vehicle headlights, said manually operable arming switch means being in circuit with said relay means, said relay means being operable between first and second current flow control positions and being effective in a first position thereof to control the flow of current to the vehicle horn by way of said motion-responsive switch means and being effective in a second position thereof to supply power to said vehicle headlights so long as said cigarette lighter is energized.

4. An antitheft device as defined in claim 1 characterized in the provision of circuit means including manually operable switch means for activating said horn at the option of the vehicle operator and independently of said motion-responsive switch means.

5. An antitheft device as defined in claim 1 characterized in the provision of vehicle headlight means including a manually operable switch connected in circuit with said manually operable arming means and with said cigarette lighter, said manually operable switch for said headlight means being operable when closed to supply energy to the vehicle headlights so long as said cigarette lighter is energized terminating automatically with the release of the lighter at the end of a heating cycle thereof.

* * * * *